Jan. 30, 1951      A. U. HUGGENBERGER      2,539,624
PNEUMATIC MEASURING DEVICE
Filed March 29, 1946

Inventor
ARNOLD U. HUGGENBERGER
by Singer, Ehlert, Stern & Carlberg
Attorneys

Patented Jan. 30, 1951

2,539,624

UNITED STATES PATENT OFFICE 2,539,624

PNEUMATIC MEASURING DEVICE

Arnold U. Huggenberger, Zurich, Switzerland

Application March 29, 1946, Serial No. 657,962
In Switzerland April 2, 1945

3 Claims. (Cl. 33—147)

When a gaseous medium of constant (positive or negative) pressure enters through an inlet-opening in a closed chamber and then passes out through an outlet-opening, the actual pressure within the chamber is indicated by the size of the outlet-opening. A requirement in this special example is that, during this procedure the pressure of the gaseous medium should be kept constant.

Figure 1:
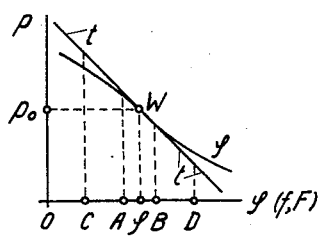

This condition is fulfilled in providing the inlet-pipe with one or several vertical branch-pipes, plunging in a container containing a liquid, the level of which is constantly maintained at the same height. The height of the liquid column above the openings of the branch-pipes acts as a kind of over-charge valve. If the working pressure rises above the prescribed constant value, the excess gas escapes in the form of gas bubbles. In this known system, the pressure in the chamber is indicated by a liquid column. The fact that a small variation of the outlet cross section results in a relatively substantial variation of the pressure in the chamber, acts as a kind of pneumatic transmission. Considering the above-mentioned law describing the linkage of the pressure in the chamber and the cross section of the passage, it appears that the curve of Fig. 1, which represents the pressure $p$ in the chamber in connection with the ratio $\varphi$ of the inlet cross section $f$ of the outlet cross section $F$, has a point of inflexion W. For measuring purposes, benefit of this feature is made use of so that a linear relation according to the tangent $t$ at the point of inflexion, can be applied with sufficient accuracy. Obviously the more distant a point on said curve is from the point of inflexion the more the actual conditions differ from each other and the greater will be the errors. The practical application of this method is therefore limited to the use of either a small measuring field—in Fig. 1 e. g. from A to B—thus obtaining a relatively high accuracy (due to the small difference existing between tangent and curve), or to be satisfied with a lesser grade of accuracy in case a large measuring field is required—Fig. 1 e. g. from C to D. The linear relation applies, strictly, only very close to the point of inflexion. In applying this method care should be taken that the starting point of the measuring device should always be set in the before-mentioned position, in order to reduce the errors as much as possible.

The maintenance of a constant working pressure by means of overflow-pipes for liquids has considerable disadvantages. Note that when the working pressure is increased the pneumatic transmission ratio is increased in the same proportion. The higher the working pressure, the higher will be, of course, the liquid column which indicates this working pressure. A high pressure has the advantage that the fine streaming-nozzles will not easily be obstructed. Therefore it will be advantageous to use as high a working pressure as possible. Working pressure of 3 ft. 3⅜ in. (1 m.) water column and even more result however in the use of impractical and very complicated measuring devices. Moreover it is to be noted that this known measuring method relates only to the variation of the cross section of the outlet-opening of the chamber while the openings used are exclusively circular.

It is possible to switch in parallel two and more chambers. Then the pressure in each of the chambers is directly influenced by the value to be determined. The chambers may be interconnected so that when two chambers are used a pressure difference is indicated which occurs when gauge blocks of different thickness are placed under each of the outlet openings. The pressure difference then corresponds to the difference in thickness of the two gauge blocks. It is however not possible to increase the transmission ratio and the linear range of measuring. This system, though using several chambers, has the same disadvantages as the single chamber system.

The method according to this invention eliminates the above mentioned disadvantages by conducting a medium either by means of pressure or by means of suction, through at least two chambers switched in parallel, whereby the condition of the medium in the chambers is simultaneously influenced by the value to be measured in opposite direction, and whereby the pressure difference represents the measuring value of the method.

The method according to the present invention can be used for measuring all modifications of state, which involve a variation of the pressure in the recess-system. It is apparent that there occurs one single process of measuring which simultaneously influences the condition in both chambers in opposite direction. Consequently, besides the variations of the conditions of the measuring device, such as: variation of the inlet- or of the outlet-cross-section, variations of the chamber volume, etc., also the variations in the state of the medium itself e. g. modification of the temperature, of the chemical and physical composition, etc., are taken into due account. In this connection it is quite immaterial whether the measuring medium flows through the system of chambers by means of pressure or by means of suction (negative pressure). The method can also be used to indicate changes in pressure of the medium flowing through the chambers when the outlet cross section remains unchanged during the operation. The measurement of the working pressure and of the pressure of the chambers is not accomplished by a water column, or by pressure gauges of a type known per se, but more advantageously by means of measuring instruments of case-shaped construction, the use of which with respect to known measuring methods is quite novel. These instruments will again be referred to later on. It is thus possible to manufacture small, handy and easily transportable measuring instruments. A working pressure may be selected as high as required. Due to the fact that the pneumatic transmission ratio increases when the working pressure increases, it is possible to select a ratio as high as actually required.

Figure 3:
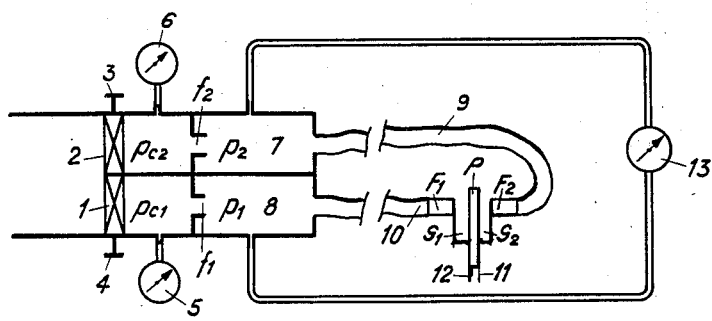
Figure 4:
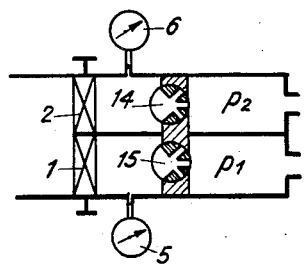
Figure 5:
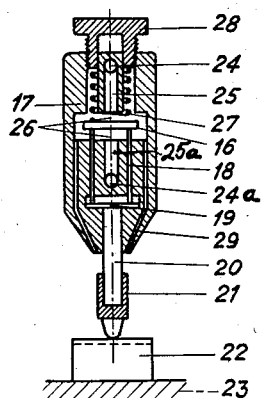
Figure 7:
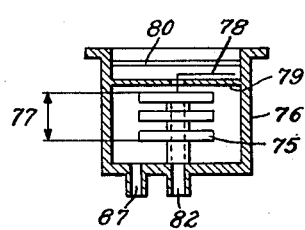
Figure 6:
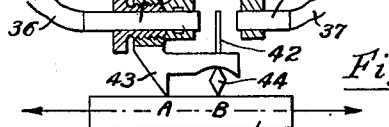

The attached drawing illustrates by way of example some embodiments of a device for applying the method according to the invention. Fig. 3 shows a schematic view of a device provided with two chambers. Fig. 4 is a partial schematic view of a partially modified device for applying the new measuring device. Fig. 5 shows a schematic sectional view of a device embodying the present invention. Fig. 6 illustrates a modification of a detail. Fig. 7 relates to a pressure indicating device based on aneroid boxes.

When the measuring medium flows under high pressure through both expansion-mechanisms 1 and 2 (Fig. 3) then the medium expands and the pressures are kept at a constant value $p_{c1}$ and $p_{c2}$ during the measuring process. The medium may however also have a lower pressure of predetermined value. The regulation of this working pressure to any predetermined value can be obtained by conveniently operating the rotary knobs 3 and 4. The value of this pressure is preferably selected according to the measuring problem to be actually solved. These pressures are indicated on the indicating devices 5 and 6. The measuring medium enters through the inlet nozzles $f_1$ and $f_2$ into the chambers 7 and 8. The outlet nozzles may be either integral with the walls of the chamber or they may be connected to the said chamber by means of fixed or movable pipe-lines 9 and 10. Generally speaking, the nozzles may be of any shape and size. It is also possible to select the nozzles in such a way that each pair has the same size, viz.

$$f_1=f_2=f$$
$$F_1=F_2=F$$

In case an outlet-nozzle of circular shape is used, the outlet cross-section forms a cylindrically shaped body, the circumference of which is:

$$2.\pi.D.s_1 \text{ and } 2.\pi.D.s_2$$

respectively, in which D is the internal diameter of the nozzle whereas $s_1$, $s_2$, respectively, are the distances between the impact surfaces 11 and 12 from the head of the nozzles. In case the impact body P is placed in the middle between both nozzle-openings, viz. in the middle of the nozzle-gap, and supposing that the working pressures are equal in both chambers viz.:

$$p_{c1}=p_{c2}=p_c$$

then the pressure in both chambers is equal, that is:

$$p_1=p_2=p$$

The pressure difference between both chambers is 0. In shifting the impact body in a right-hand direction, the pressure in the chamber 7 will be increased by the same amount as it decreases, in the meantime, in the chamber 8. The measuring device 13 gives therefore the sum of both pressure variations. In using the system with two chambers a greater sensitiveness is obtained than when one single chamber is used. The fact, that this system is characterized by the presence of an accurate zero position, renders the manipulation very easy.

Figure 2:
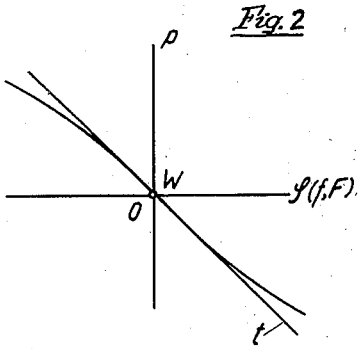

The described method is not limited to the presence of a single chamber, as in known methods, on the contrary, it uses two or more chambers, which are arranged in parallel. The new idea of the multiple-chamber system allows the inflexion point W of Fig. 2 to coincide with the real co-ordinate zero-point, so that a well determined zero-point is obtained. The linear measuring range is thus substantially widened. Moreover in providing for the insertion of the elimination of whatever number of outlet-cross sections, it is possible to widen to any value the actual measuring range as well as to increase the accuracy either step by step or continuously.

Each of the chambers 7 and 8 can be provided with several inlet- and outlet-nozzles, which operate always connected into pairs, viz.—inlet-nozzle and outlet-nozzle together—during the measuring process.

Fig. 4 shows schematically, as an example, such an arrangement, in which in a plug-cock 14 and 15 three different inlet-openings are provided. By conveniently revolving the plug, one opening at a time can be inserted. A similar arrangement can be made for the outlet-nozzle. Obviously, it is also possible to provide such openings for the inlet- and outlet-nozzles. It is also possible to gradually change the size of the inlet- and outlet-nozzle cross-section, by applying a diaphragm of known construction, such as is used in photographic instruments.

The simultaneously and oppositely directed pressure change in the two chambers can be employed for various purposes, e. g. for displacing an impact body P as shown in Figure 3. In Fig. 5 the impact body 16 is a part of a measuring device by means of which the thickness, the difference in height, the length of an article, etc., can be measured. The impact plate 16 is arranged within a cylindrical casing 17. Two guiding rods 18 connect the impact plate 16 with the cross beam 19, which carries the feeler rod 20. On this feeler rod appropriate shaped and interchangeable feeler caps 21 can be interchangeably clamped. These caps bear against the surface of the body 22 to be measured, this latter resting on the base 23, arranged as a measuring table forming a part of a stand rigidly connected with the casing 17. The measuring medium enters at 24 and 24a in the ducts 25 and 25a and reaches in chamber 26 the impact plate 16, which shifts itself according to the variation in thickness of the body 22 to be measured. The spring 27 provides for the necessary pressure, in order to secure the necessary reliable contact between the body 22 and the measuring device. The measuring pressure can, for instance, be adjusted by modifying the pressure of the spring 27 by conveniently operating the threaded sleeve 28. In the bottom part of the cylindrical casing an appropriate number of apertures 29 is provided, through which the medium escapes to the outside. These apertures are disposed axially with regard to the axis of the casing and are directed against the measuring spot. The outstreaming medium cleans therefore this measuring spot by blowing it constantly out.

In Fig. 6 the yoke 45 with both nozzles 46 and 47 is arranged movable in the holder 43. The above mentioned zero-position of the device can also be obtained when the impact plate is stationary, viz. by shifting the yoke 45 by means of the threaded sleeve 48. This possibility of displacement provides the advantage that the measuring capacity can be set on one or on the other end-position, when starting the measurement, so that for carrying out the measurement it is possible to make use not only of the capacity from the position zero up to the end-position, but from one end-position to the other one. When fastening the expansion-measuring device according to Fig. 6 on the test piece 49 it will practically never happen that the impact plate is exactly located in the middle of the gap. It will take some other position within the gap. Owing to the shifting possibility above referred to it is possible to subsequently set the zero-point or one of the end-positions on the mounted expansion measuring device.

It has already been mentioned that pressure indicating instruments at present in common use, viz. instruments making use of a water column, of the well known Bourdon tube or of a diaphragm cannot be used in connection with the method according to this invention. Such instruments are not precise and sensitive enough. It is therefore suggested to use aneroid boxes 75 as pressure measuring elements. Aneroid boxes have hitherto never been used in connection with a similar measuring method. Several aneroids may form an integral group of instruments which may be placed in a hermetically sealed casing 76 (see Fig. 7). The height of an aneroid box or of the group of aneroid boxes varies according to the pressure in the casing. This variation in height may be increased by any mechanical means known per se which is not represented in Figure 7. A pointer 78 cooperating with a dial 79 indicates the amount of the deflection. A transparent plate 80 closes the casing. When measuring a pressure the chamber disposed within the casing is connected to the medium under pressure by means of nipple 87. When measuring a pressure difference the nipples 87 and 82 respectively are connected to the two mediums under pressure. To this end the various aneroids are interconnected, as shown in the drawing. The indicating instruments 5 and 6 represented in the Figures 3 and 4 are instruments of this type. These pressure indicating instruments form a considerable progress over pressure indicating instruments as presently used.

What I wish to secure by United States Letters Patent is:

1. In a pneumatically operated measuring device, a base, a vertically positioned cylindrical casing arranged with its lower end in spaced relation above the base to which said casing is rigidly secured, said cylindrical casing being provided between its ends with a chamber in the center of which a horizontally disposed impact plate is arranged, means forming two air discharge nozzles arranged in said cylindrical chamber and directing the air against the upper and lower face respectively of said impact plate, a feeler rod slidably mounted in the lower end of said cylindrical casing and projecting downwardly therefrom, a cross beam connected to the upper end of said feeler rod, guide rods connecting said impact blade with said cross beam, means for connecting said nozzles each with a chamber containing a supply of air pressure, means for supplying said chambers with air pressure of constant pressure of the same magnitude, and means for indicating the differential air pressure between said chambers upon displacement of said impact blade by the feeler engaging an article placed upon said base.

2. In a pneumatically operated measuring device, a base, a vertically positioned cylindrical casing arranged with its lower end in spaced relation above the base to which said casing is rigidly secured, said cylindrical casing being provided between its ends with a chamber in the center of which a horizontally disposed impact plate is arranged, means forming two air discharge nozzles arranged in said cylindrical chamber and directing the air against the upper and lower face respectively of said impact plate, a feeler rod slidably mounted in the lower end of said cylindrical casing and projecting downwardly therefrom, a cross beam connected to the upper end of said feeler rod, guide rods connecting said impact blade with said cross beam, spring means in said cylindrical casing and acting upon the upper face of said impact blade, means for connecting said nozzles each with a chamber containing a supply of air pressure, means for supplying said chambers with air pressure of constant pressure of the same magnitude, and means for indicating the differential air pressure between said chambers upon displacement of said impact blade by the feeler engaging an article placed upon said base.

3. In a pneumatically operated measuring device, a base, a casing arranged with its lower end in spaced relation above the base to which said casing is rigidly secured, said casing being provided between its ends with a chamber in the center of which an impact plate is arranged, means forming two air discharge nozzles arranged in said chamber, and directing the air against the upper and lower face respectively of said impact plate, a feeler rod slidably mounted in the lower end of said casing and projecting downwardly therefrom, a cross beam connected to the upper end of said feeler rod, guide rods connecting said impact blade with said cross beam, means for connecting said nozzles, each with a chamber containing a supply of air under pressure, means for supplying said chambers with air pressure of constant pressure of the same magnitude and means for indicating the differential air pressure between said chambers upon displacement of said impact blade by the feeler engaging an article placed upon said base.

ARNOLD U. HUGGENBERGER.

REFERENCES CITED

The following references are of record in the file of this patent:

UNITED STATES PATENTS

| Number | Name | Date |
| --- | --- | --- |
| 1,954,442 | Doll et al. | Apr. 10, 1934 |
| 1,985,576 | Mennesson | Dec. 25, 1934 |
| 2,065,702 | Hubbard | Dec. 29, 1936 |
| 2,129,586 | Moller | Sept. 6, 1938 |
| 2,311,853 | Moore | Feb. 23, 1943 |
| 2,345,732 | Davies et al. | Apr. 4, 1944 |
| 2,397,494 | Kuppersmith | Apr. 2, 1946 |